(12) United States Patent
Kohiyama et al.

(10) Patent No.: US 9,177,117 B2
(45) Date of Patent: Nov. 3, 2015

(54) SECURE MODULE AND INFORMATION PROCESSING APPARATUS

(75) Inventors: Kiyoshi Kohiyama, Kawasaki (JP);
Masakazu Takakusu, Yokohama (JP);
Tatsuro Kawakami, Yokohama (JP);
Toshiyuki Yoshitake, Kawasaki (JP)

(73) Assignees: FUJITSU LIMITED, Kawasaki (JP);
FUJITSU SEMICONDUCTOR LIMITED, Yokohama (JP)

( * ) Notice: Subject to any disclaimer, the term of this patent is extended or adjusted under 35 U.S.C. 154(b) by 124 days.

(21) Appl. No.: 13/094,518

(22) Filed: Apr. 26, 2011

(65) Prior Publication Data

US 2012/0042380 A1 Feb. 16, 2012

(30) Foreign Application Priority Data

Aug. 10, 2010 (JP) ................................. 2010-179876

(51) Int. Cl.
G06F 11/00 (2006.01)
H04L 29/06 (2006.01)
G06F 21/10 (2013.01)
G06F 21/14 (2013.01)
(Continued)

(52) U.S. Cl.
CPC ............... *G06F 21/10* (2013.01); *G06F 21/14* (2013.01); *G06F 21/54* (2013.01); *H04N 21/4143* (2013.01); *H04N 21/4181* (2013.01); *H04N 21/443* (2013.01); *H04N 21/4627* (2013.01); *H04N 21/8173* (2013.01); *G06F 2221/0797* (2013.01); *G06F 2221/2153* (2013.01)

(58) Field of Classification Search
CPC ......... G06F 21/10; G06F 21/14; G06F 21/54; G06F 2221/0797; H04N 21/8173; H04N 21/4143; H04N 21/418; H04N 21/443
See application file for complete search history.

(56) References Cited

U.S. PATENT DOCUMENTS 4,434,436 A * 2/1984 Kleykamp et al. ............ 380/209
5,875,323 A * 2/1999 Machida ....................... 712/221
(Continued)

FOREIGN PATENT DOCUMENTS

EP           1 387 238 A2    2/2004
JP        2003-198527 A      7/2003
(Continued)

OTHER PUBLICATIONS

Jean Daniel Aussel et al. "Smart Cards and Remote Entrusting" Copyright 2009 pp. 38-45.*
(Continued)

*Primary Examiner* — Joshua Joo
*Assistant Examiner* — Younes Naji
(74) *Attorney, Agent, or Firm* — Arent Fox LLP

(57) ABSTRACT

A secure module includes a generating unit that executes generation processing of generating a scanning program that causes scan processing, which generates unique code for a program under test, to be executed at a connected device and further executes update processing of randomly updating contents of the scanning program; a storage device storing therein the unique code for the program under test; and an authenticating unit that if the scanning program is executed by the connected device and executed with respect to the program under test stored at a designated storage area in the connected device, authenticates validity of the program under test stored at the designated storage area, based on the unique code stored in the storage device and execution results of the scanning program executed at the connected device.

15 Claims, 19 Drawing Sheets

(51) Int. Cl.

| | | |
|---|---|---|
| *G06F 21/54* | (2013.01) | |
| *H04N 21/4143* | (2011.01) | |
| *H04N 21/418* | (2011.01) | |
| *H04N 21/443* | (2011.01) | |
| *H04N 21/4627* | (2011.01) | |
| *H04N 21/81* | (2011.01) | |

(56) References Cited

U.S. PATENT DOCUMENTS

| | | | | |
|---|---|---|---|---|
| 5,915,025 | A * | 6/1999 | Taguchi et al. | 380/44 |
| 7,765,579 | B2 * | 7/2010 | Wallace | 726/1 |
| 7,853,534 | B2 * | 12/2010 | Su | 705/67 |
| 8,086,677 | B2 * | 12/2011 | Murphy | 709/206 |
| 8,266,423 | B2 * | 9/2012 | Giraud et al. | 713/152 |
| 2003/0126457 | A1 | 7/2003 | Kohiyama et al. | |
| 2004/0059934 | A1 | 3/2004 | Kohiyama et al. | |
| 2006/0112416 | A1 * | 5/2006 | Ohta et al. | 726/1 |
| 2007/0200661 | A1 * | 8/2007 | Blum | 340/5.25 |
| 2008/0072332 | A1 * | 3/2008 | Kohiyama et al. | 726/26 |
| 2009/0144197 | A1 * | 6/2009 | Hurry | 705/41 |
| 2009/0144825 | A1 * | 6/2009 | Schluessler et al. | 726/23 |
| 2010/0061554 | A1 * | 3/2010 | Hedinger | 380/269 |
| 2010/0197275 | A1 * | 8/2010 | Yamasaki | 455/411 |
| 2011/0066853 | A1 * | 3/2011 | Engels et al. | 713/168 |

FOREIGN PATENT DOCUMENTS

| | | |
|---|---|---|
| JP | 2004-129227 A | 4/2004 |
| JP | 2004-192068 | 7/2004 |

OTHER PUBLICATIONS

Paolo Falcarin et al. "Remote Trust with Aspect Oriented Programming" 2006 pp. 451-458.*

Cohen et al "Operating System Protection Through Program Evolution" Copyright 1992 pp. 1-30.*

Jean et al "Smart Cards and remote entrusting"Gemalto Teclmology & Innovation p. 38-45.*

Cohen et al. "Operating System Protection Through Program Evolution" publication date :1992.*

Paolo et al. "Remote Trust with Aspect Oriented Programming" Publication date : 2006.*

Brecht Wyseur, "Re-Trust: Trustworthy Execution of SW on Remote Untrusted Platforms", Katholiek Universiteit Leuven, Dep't of Elec. Eng'g ESAT/COSIC-IBBT, Kasteelpark Arenberg 10, 3001 Heverlee, Belgium, pp. 1-11, Highlights of the Inform. Security Solutions Europe 2009 Conf. (2009).

Office Action dated Apr. 29, 2013 issued in a corresponding Korean patent Applicaton.

Chinese Office Action issued Jun. 16, 2014; Application No. 201110135244.7, along with English Translation.

Japanese Office Action dated Apr. 15, 2014; Japanese Application No. 2010-179876.

Chinese Office Action with English translation issued on Sep. 29, 2013.

Chinese Office Action, dated Dec. 22, 2014, issued in Chinese Patent Application No. 201110135244.7.

European Office Action mailed Apr. 22, 2015 for corresponding European Patent Application No. 11 164 136.1.

Paolo Falcarin et al., "Remote Trust with Aspect-Oriented Programming", The Computer Society, Advanced Information Networking and Applications, Apr. 18, 2006, pp. 451-458, vol. 1.

Jean-Daniel Aussel et al., "Smart Cards and Remote Entrusting", Future of Trust in Computing: Proceedings of the First International Conference Future of Trust in Computing 2008, Jan. 1, 2099, pp. 38-45.

Frederick B. Cohen, "Operating System Protection Through Program Evolution", Computers & Security, Oct. 1, 1993, pp. 565-584, vol. 12, No. 6.

Christian Collberg et al., "A Taxonomy of Obfuscating Transformations", Technical Report Department of Computer Science University Ofauckland, Jul. 1, 1997, pp. 1-36, No. 148.

Riccardo Scandariato et al., "Application-Oriented Trust in Distributed Computing", Availability, Reliability and Security, Mar. 4, 2008, pp. 434-439.

* cited by examiner

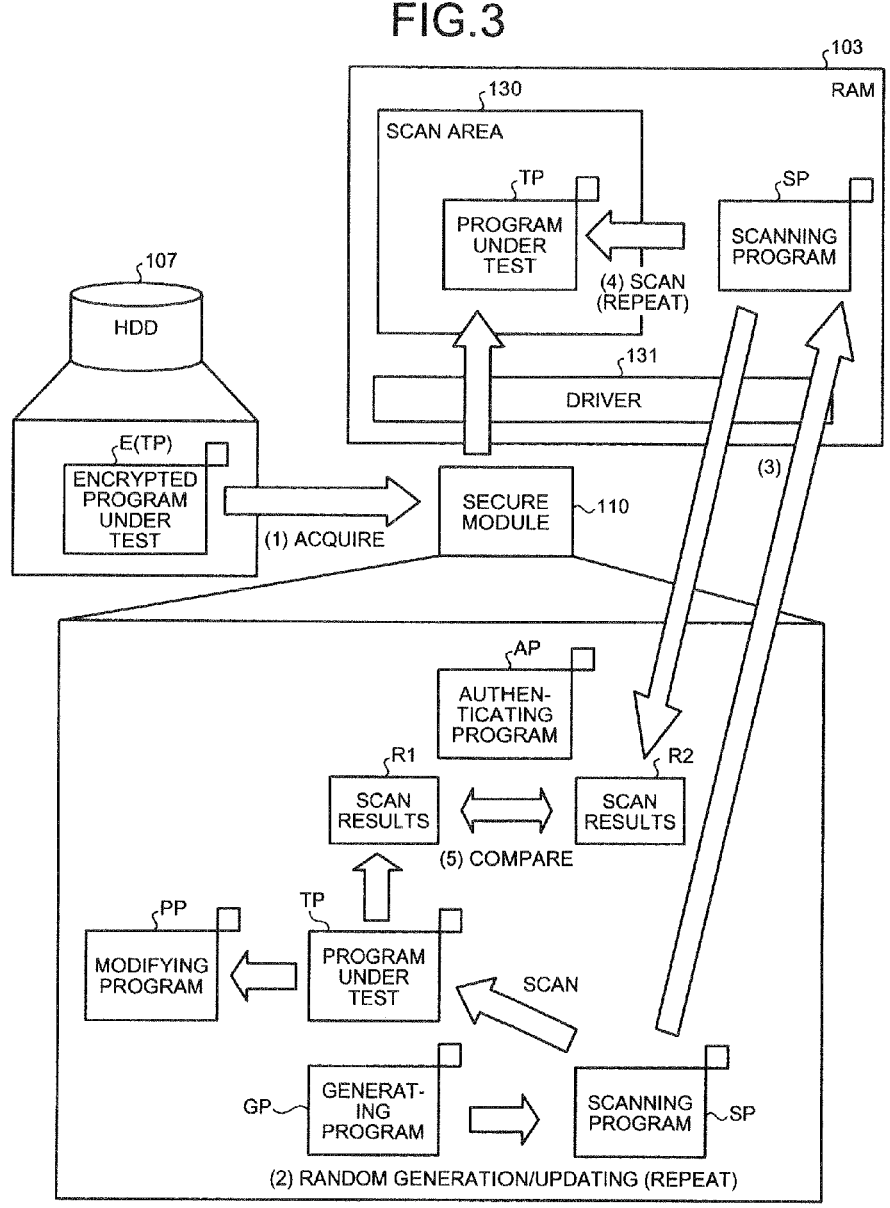

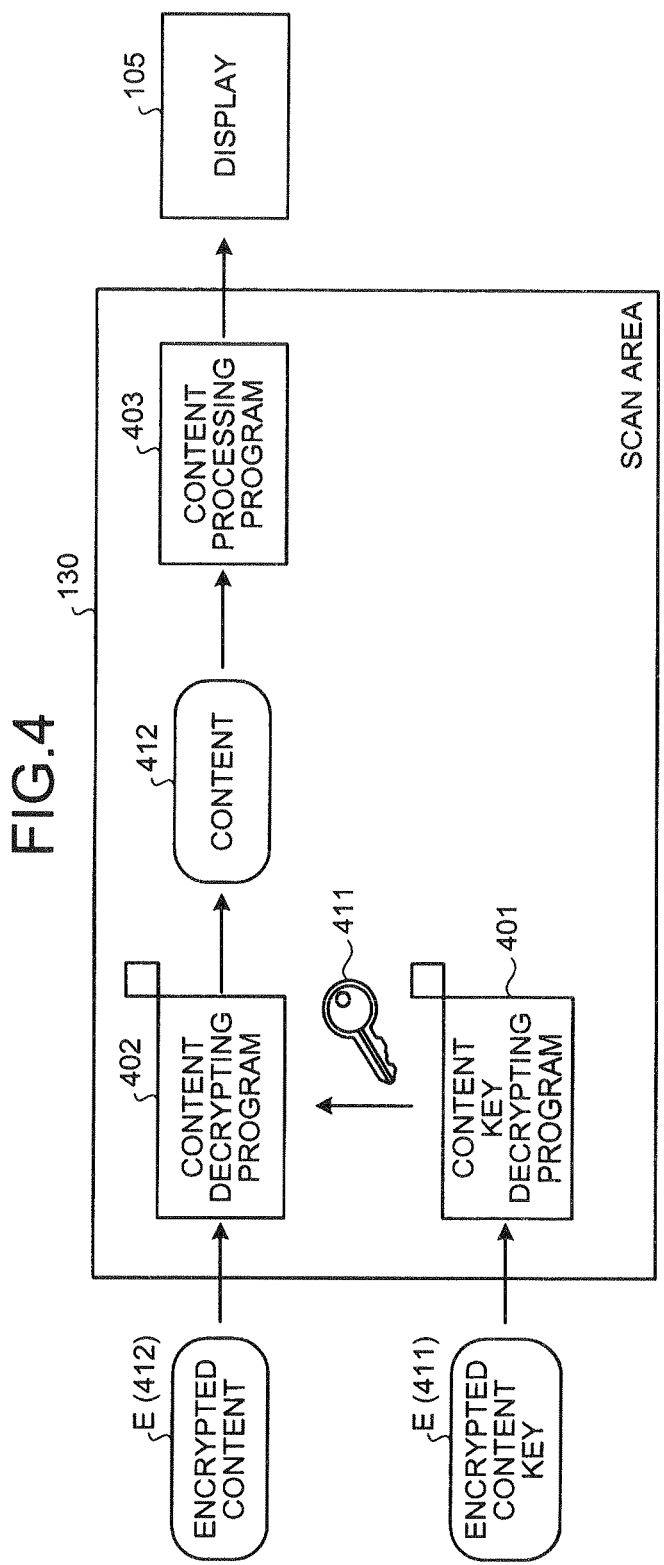

| ADDRESS | CONTENTS |
|---|---|
| 1 | READ CONTENTS OF laddr_11 AND WRITE TO laddr_1001 |
| 2 | READ CONTENTS OF laddr_12 AND WRITE TO laddr_1002 |
| 3 | READ CONTENTS OF laddr_13 AND WRITE TO laddr_1003 |
| 4 | READ CONTENTS OF laddr_14 AND WRITE TO laddr_1004 |
| 5 | READ CONTENTS OF laddr_15 AND WRITE TO laddr_1005 |
| 6 | ADD CONTENTS OF laddr_1001~laddr_1005 |
| 7 | WRITE SUM AT ADDRESS 6 TO laddr_1010 |
| 8 | ADD 80 TO CONTENTS OF laddr_1010 AND MULTIPLY RESULT BY 5 |
| 9 | WRITE CALCULATION RESULT AT ADDRESS 8 TO laddr_1011 |
| 10 | REPORT CONTENTS OF laddr_1011 TO SECURE MODULE |

| ADDRESS | CONTENTS |
|---|---|
| 1 | READ CONTENTS OF laddr_21 AND WRITE TO laddr_1001 |
| 2 | READ CONTENTS OF laddr_22 AND WRITE TO laddr_1002 |
| 3 | READ CONTENTS OF laddr_23 AND WRITE TO laddr_1003 |
| 4 | READ CONTENTS OF laddr_24 AND WRITE TO laddr_1004 |
| 5 | READ CONTENTS OF laddr_25 AND WRITE TO laddr_1005 |
| 6 | ADD CONTENTS OF laddr_1001~laddr_1005 |
| 7 | WRITE SUM AT ADDRESS 6 TO laddr_1010 |
| 8 | ADD 80 TO CONTENTS OF laddr_1010 AND MULTIPLY RESULT BY 5 |
| 9 | WRITE CALCULATION RESULT AT ADDRESS 8 TO laddr_1011 |
| 10 | REPORT CONTENTS OF laddr_1011 TO SECURE MODULE |

FIG.7

| ADDRESS | CONTENTS |
|---|---|
| 1 | READ CONTENTS OF laddr_11 AND WRITE TO laddr_1001 |
| 2 | READ CONTENTS OF laddr_12 AND WRITE TO laddr_1002 |
| 3 | READ CONTENTS OF laddr_13 AND WRITE TO laddr_1003 |
| 4 | READ CONTENTS OF laddr_14 AND WRITE TO laddr_1004 |
| 5 | READ CONTENTS OF laddr_15 AND WRITE TO laddr_1005 |
| 6 | ADD RESULT OF ADDING 1 TO CONTENTS OF laddr_1001, RESULT OF MULTIPLYING CONTENTS OF laddr_1002 BY 3, RESULT OF ADDING 5 TO CONTENTS OF laddr_1003, RESULT OF LOGICAL ADDITION OF CONTENTS OF laddr_1004 AND "0110", AND CONTENTS OF laddr_1005 |
| 7 | WRITE SUM AT ADDRESS 6 TO laddr_1010 |
| 8 | ADD 80 TO CONTENTS OF laddr_1010 AND MULTIPLY RESULT BY 5 |
| 9 | WRITE CALCULATION RESULT AT ADDRESS 8 TO laddr_1011 |
| 10 | REPORT CONTENTS OF laddr_1011 TO SECURE MODULE |

| ADDRESS | CONTENTS | SP |
|---|---|---|
| 1 | READ CONTENTS OF laddr_12, ADD LOGICAL ADDRESS OF SCANNING PROGRAM TO CONTENTS, AND WRITE TO laddr_1001 | |
| 2 | READ CONTENTS OF laddr_11, ADD LOGICAL ADDRESS OF SCANNING PROGRAM TO CONTENTS, AND WRITE TO laddr_1002 | |
| 3 | READ CONTENTS OF laddr_15, ADD LOGICAL ADDRESS OF SCANNING PROGRAM TO CONTENTS, AND WRITE TO laddr_1003 | |
| 4 | READ CONTENTS OF laddr_14, ADD LOGICAL ADDRESS OF SCANNING PROGRAM TO CONTENTS, AND WRITE TO laddr_1004 | |
| 5 | READ CONTENTS OF laddr_13, ADD LOGICAL ADDRESS OF SCANNING PROGRAM TO CONTENTS, AND WRITE TO laddr_1005 | |
| 6 | ADD RESULT OF ADDING 1 TO CONTENTS OF laddr_1001, RESULT OF MULTIPLYING CONTENTS OF laddr_1002 BY 3, RESULT OF ADDING 5 TO CONTENTS OF laddr_1003, RESULT OF LOGICAL ADDITION OF CONTENTS OF laddr_1004 AND "0110", AND CONTENTS OF laddr_1005 | |
| 7 | WRITE SUM AT ADDRESS 6 TO laddr_1010 | |
| 8 | ADD 80 TO CONTENTS OF laddr_1010 AND MULTIPLY RESULT BY 5 | |
| 9 | WRITE CALCULATION RESULT AT ADDRESS 8 TO laddr_1011 | |
| 10 | REPORT CONTENTS OF laddr_1011 TO SECURE MODULE | |

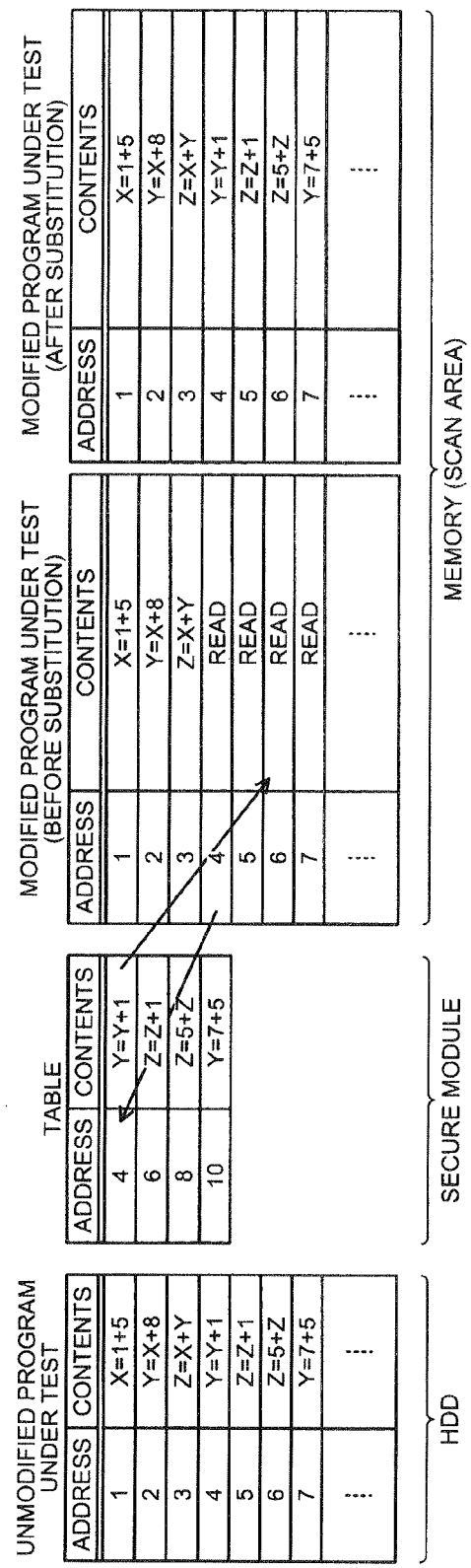

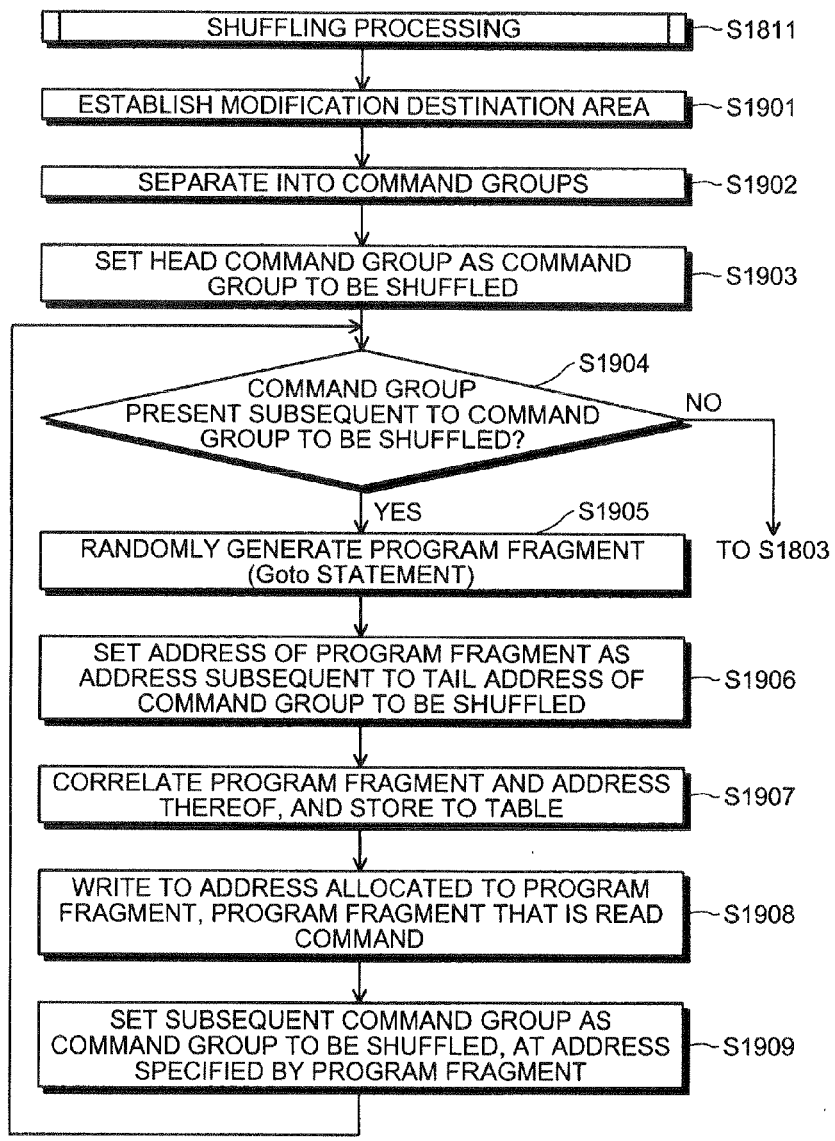

SECURE MODULE AND INFORMATION PROCESSING APPARATUS

CROSS REFERENCE TO RELATED APPLICATIONS

This application is based upon and claims the benefit of priority of the prior Japanese Patent Application No. 2010-179876, filed on Aug. 10, 2010, the entire contents of which are incorporated herein by reference.

FIELD

The embodiment discussed herein is related to a secure module and information processing apparatus that protect information.

BACKGROUND

With broadband internet and digital broadcasts becoming more prevalent, copyright protection technology that ensures the security of delivered content (primarily digital audiovisual (AV) content) have come to the fore. In particular, personal computers (PCs) having open architecture, make implementing security difficult since programs (software) that are stored to memory and process AV content reside in an environment where anyone can view, analyze and rewrite the program.

In other words, when AV content resides on the internet or on a broadcast network, although the AV content is encrypted and thus, secure, when the AV content is received and processed by a PC, the AV content must be decrypted and the decrypted AV content may be subject to illegal copying. With programs on the memory of a PC, anyone can view and rewrite the programs and thus, in principle, an alteration could be made enabling a program to be analyzed, whereby decrypted AV content is copied to, for example, a hard disk without authorization.

On the other hand, since the PC is a primary gateway to broadband internet, if security can be ensured, distribution of digital AV content over the entire internet would be possible, the significance of which is enormous.

Conventionally, mainstream program security on a PC involves concealing the algorithm that ensures security and obfuscation to make analysis of the algorithm difficult (i.e., to increase complexity without limitation to the program, to increase difficulty without limitation to program analysis, the first step of illegal program rewriting).

However, once a program is expanded on the main memory, copying is easy consequent to the memory being a visible environment as previously explained, and by taking the time to analyze the copied program, one can analyze the copyright protecting algorithm. In a system having a high degree of shared broadcasts, considered an extremely unstable copyright protecting system in terms of security, adoption of such a program is difficult with consideration of the damage that could be incurred by a single analysis.

Further, a method to guarantee program security may be considered where a secure module (a tamper-proof module) guaranteed for security and as a base for reliability, scans (in real-time) a program expanded at a memory region of the apparatus and does not allow the rewriting of the program to prevent tampering (illegal rewriting) of the program (see, for example, Japanese Laid-Open Patent Publication Nos. 2004-129227 and 2003-198527).

This base for reliability is a security guaranteed secure module (a tamper-proof module, basically, hardware) and the disabling of this hardware is extremely difficult, thereby dramatically improving security. In Japanese Laid-Open Patent Publication No. 2004-129227 above, if the secure module program scans a program in real-time, "scan function disabling" is interrupted, whereby hardware scanning called direct memory access (DMA) scanning that uses DMA is employed.

The hardware scanning described above can be applied only to compatible systems. In other words, it is assumed that the secure module and PC connection interface is an interface capable of hardware scanning and is limited to, for example, peripheral component interconnect (PCI) interfaces and PCI express (PCIe) interfaces.

On the other hand, the most common interface connecting a PC and module is a universal serial bus (USB). Since USB does not support hardware scan functions, hardware scans cannot be applied.

USB compliant software (drivers, etc.) on PCs requires a request for all processing. For example, if a module having a USB interface requests a scan, the module makes a request to the USB compliant software on a PC for a scan of the memory of the PC. The USB compliant software having received the request, executes the scan and returns the results of the scan to the module. Here, USB compatible software on a PC is at risk of being illegally tampered with, disabling the scan function.

SUMMARY

According to an aspect of an embodiment, a secure module includes a generating unit that executes generation processing of generating a scanning program that causes scan processing, which generates unique code for the program under test, to be executed at a connected device and executes update processing of randomly updating contents of the scanning program; a storage device storing therein the unique code for the program under test; and an authenticating unit that if the scanning program is executed by the connected device and executed with respect to the program under test stored at a designated storage area in the connected device, authenticates validity of the program under test stored at the designated storage area, based on the unique code stored in the storage device and execution results of the scanning program executed at the connected device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts an exemplary overview of the operation of the information processing apparatus.

FIG. 4 depicts an example of execution of a program under test TP.

FIGS. 5, 6, 7, and 8 depict examples of a scanning program.

FIGS. 15, 16, 17A, and 17B depict examples of modification of the program under test TP by a modifying program.

FIG. 19 is a flowchart of shuffling processing (step S1811) depicted in FIG. 18.

DESCRIPTION OF EMBODIMENTS

Preferred embodiments of the present invention will be explained with reference to the accompanying drawings. An information processing apparatus, for example, is a computer such as a personal computer, a stationary video game console, a television, a hard disk recorder, a mobile terminal (a mobile telephone, a smart phone, a portable video game player, an electronic dictionary, tablet terminal), etc.

Figure 1:
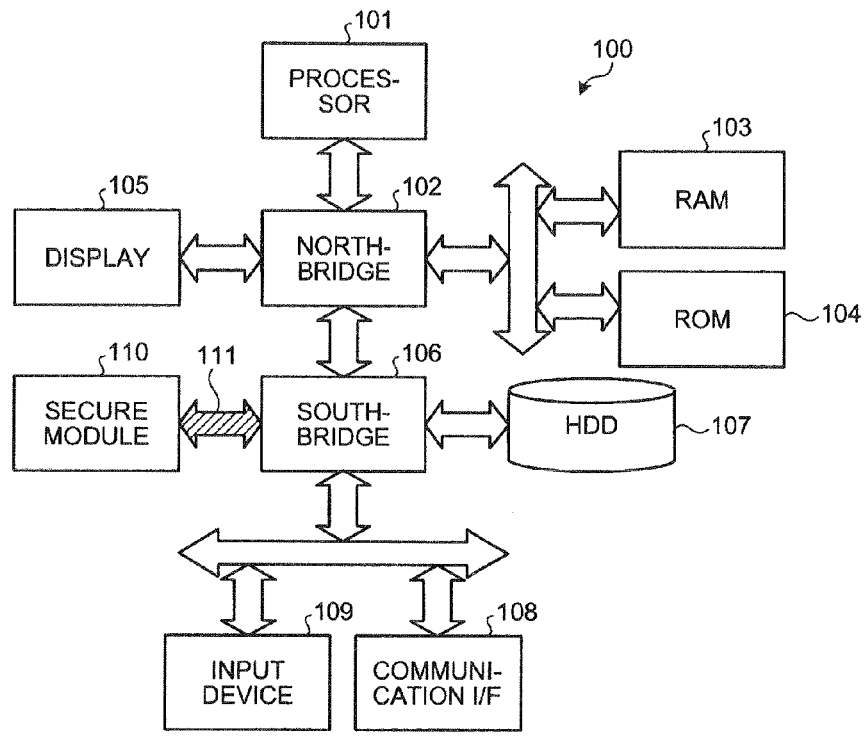
FIG. 1 is a block diagram of a hardware configuration of an information processing apparatus.

FIG. 1 is a block diagram of a hardware configuration of the information processing apparatus. information processing apparatus 100 includes a processor 101, a northbridge 102, memory (RAM 103, ROM 104), a display 105, a southbridge 106, a hard disk drive (HDD) 107, a communication interface (I/F) 108, an input device 109, and a secure module 110, respectively connected by a bus.

The processor 101 controls the information processing apparatus 100 and performs computation processing. The northbridge 102 is connected to and forms a bridge among the processor 101, the memory, the display 105, and the southbridge 106. The RAM 103 is main memory used as a work area of the processor 101. The ROM 104 is non-volatile memory storing therein programs and data. The display 105 displays, for example, data such as text, images, functional information, etc., in addition to a cursor, icons, and/or tool boxes.

The southbridge 106 is connected to and forms a bridge among the northbridge 102, the HDD 107, the communication I/F 108, the input device 109, and the secure module 110. The HDD 107, under the control of the processor 101, is a drive apparatus controlling the reading and writing of data with respect to an internal hard disk.

The communication I/F 108 is an interface that under the control of the southbridge 106 is connectable, through a communication line, to a network such as a local area network (LAN), a wide area network (WAN), and the internet. The communication I/F is further an interface capable of receiving a digital broadcast wave.

The input device 109 is an apparatus for inputting text, numerals, various instructions, etc. and may be, for example, a keyboard, a mouse, a touch panel and the like. Input data from the input device 109 is sent to the processor 101 via the southbridge 106 and the northbridge 102, and is processed by the processor 101.

The secure module 110 is a large scale integration (LSI) of a configuration that prevents internally stored information from being referenced by an external device, and is hardware that prevents viewing from an external device and further prevents tampering of internal data. The secure module 110 has, for example, a tamper resistant module (TRM) configuration.

A TRM configuration is a configuration for physically and logically protecting against internal semiconductor (in this case, the secure module 110) analysis and tampering. For example, in the secure module 110, the interior is coated with an extremely strong and adhesive coating, where if the surface of the coating is removed, the internal circuits are completely destroyed, or dummy wiring is arranged in the secure module 110.

The secure module 110 has functions of reading out from the HDD 107, software that is to be monitored (program under test), of generating/updating scanning programs that scan the program under test, of implementing the program under test and/or the scanning program on the RAM 103, of encrypting, and of decrypting. The secure module 110 is communicably connected via the USB controller in the southbridge 106 and a USB bus 111. The secure module 110 may be built in the information processing apparatus 100 or may be provided externally.

Figure 2:
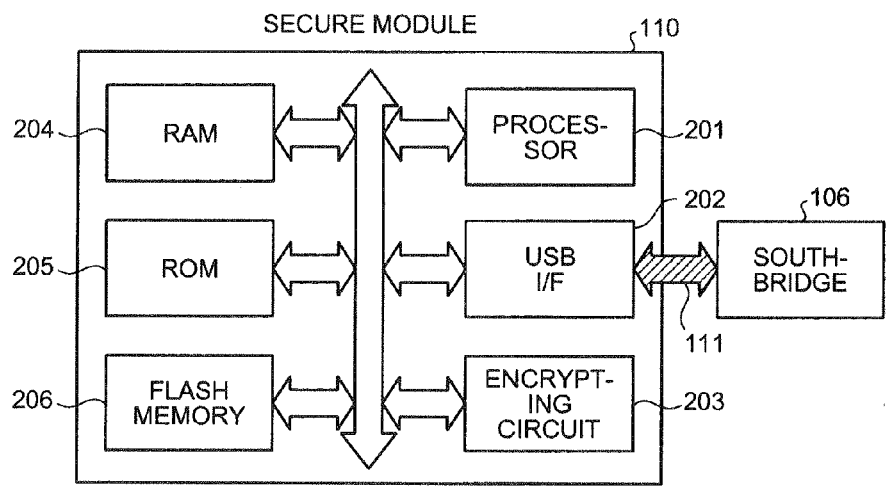
FIG. 2 depicts a block diagram of a hardware configuration of a secure module.

FIG. 2 depicts a block diagram of a hardware configuration of the secure module 110. The secure module 110 includes a processor 201, a USB I/F 202, an encrypting circuit 203, RAM 204, ROM 205, and flash memory 206.

The processor 201 performs internal control of the secure module 110 and computation processing. The USB I/F 202 is connected to the USB controller in the southbridge 106 via the USB bus 111 and performs communication. The encrypting circuit 203 encrypts data and programs, and decrypts encrypted data and programs.

The RAM 204 is main memory used as a work area of the processor 201. The ROM 205 is non-volatile memory storing therein programs and data. The flash memory 206 is non-volatile memory enabling the rewriting of stored data and programs.

An overview of the operation of the information processing apparatus 100 will be described. In the present embodiment, the secure module 110 protecting the software on the information processing apparatus 100 from rewriting is connected to the information processing apparatus 100 by a USB interface incapable of hardware scanning. Therefore, when the secure module 110 normally requests (via the USB interface) the USB compatible software (typically, a "driver") for a scan of an area in the memory, the USB compatible software is cracked.

For example, the USB compatible software is cracked to return a result indicating that rewriting has not occurred, even if the software on the information processing apparatus 100 has been rewritten. Thus, the scanning function may not effectively operate, whereby in the present embodiment, the following processing is executed.

FIG. 3 depicts an exemplary overview of the operation of the information processing apparatus 100. In the present embodiment, (1) the secure module 110 acquires a program under test (encrypted program under test E(TP)) encrypted and stored in the HDD 107 and uses the encrypting circuit 203 to decrypt the encrypted program under test E(TP) to a program under test TP. Subsequently, the secure module 110 writes to a scan area 130 in the RAM 103, the decrypted program under test TP. The program under test TP may be retained in the secure module 110.

If the program stored in the HDD 107 is not encrypted, the acquired program under test TP is stored to the scan area 130 of the RAM 103 without decryption by the secure module 110.

Further, the secure module 110 may modify the program under test TP by a modifying program PP. Although details of the modification are described hereinafter, operation of the program under test TP is the same, but the details and order of the processing are modified. Further, consequent to this modification, a portion of the program under test TP (a program fragment) is retained in the secure module 110 and when the program under test TP is executed on the information processing apparatus 100, the execution of the program under test TP cannot continue without a referencing of the program fragment in the secure module 110.

(2) The secure module 110 executes, periodically or at random intervals, a generating program GP that automatically generates/updates the scanning program SP randomly. For example, although the function of scanning the program under test TP does not change, the scanning program SP, the processing details of which differ each time, is automatically generated randomly.

This automatic generation, for example, may be performed periodically at intervals of several msec to several minutes or may be performed at random intervals. In either case, the interval is set to be shorter than the time required for tampering by a cracker.

The generating program GP randomly changes, for example, the scan area 130, the sequence of scan addresses, scan result computation, computation processing of returning a computed result to the secure module 110, scanning program SP code, location on memory of the information processing apparatus 100, etc. The random generation/update processing of the scanning program SP by the generating program GP is executed in the secure module 110 and therefore, generation processing is not viewed, analyzed, nor are the results of which invalidated.

If the scanning program SP is generated/updated by the generating program GP, the secure module 110 also scans the program under test TP using the most recent scanning program SP and updates scan result R1. The scan result R1 is stored to the RAM 204 or the flash memory 206 and is unique code for the program under test TP.

(3) The scanning program SP requests a driver 131 to cause the processor 101 provide arrangement at an area that is not to be scanned on the RAM 103. Consequently, the driver 131 causes the processor 101 to store to an area that is not to be scanned on the RAM 103, the scanning program SP sent from the secure module 110.

(4) The scanning program SP stored to the RAM 103 causes the processor 101 to scan a program under test TP in the scan area 130. Scan result R2 is reported to the secure module 110, via the driver 131.

(5) The secure module 110 receives the scan result R2 sent from the driver 131. When the scan result R2 is received, an authenticating program AP causes the processor 201 to compare the scan result R1 retained in the secure module 110 and the received scan result R2 for coincidence.

If the scan results R1 and R2 coincide, the program under test TP has not been tampered with. On the other hand, if the program under test TP has been rewritten, the secure module 110 sends to the processor 101, an instruction to end execution of the program under test TP, whereby the processor 101, upon receiving the instruction, ends execution of the program under test TP.

Further, if the scan result R2 has not been received from the driver 131 even after a given period has elapsed, the secure module 110 sends to the processor 101, an instruction to end execution of the program under test TP.

(6) The secure module 110 recursively executes (2) to (5) above until the operation of the program under test TP ends.

In this manner, the scanning program SP is caused to be randomly generated/updated by the secure module 110 periodically or at random intervals, whereby, for example, even if the scanning program SP resides in the memory of the information processing apparatus 100, i.e., an environment where anyone can view and analyze the scanning program SP, there is no risk of cracking by a cracker.

In other words, a given amount of time is required for a cracker to view, analyze, and rewrite the scanning program SP into a fake scanning program. However, since the secure module 110, periodically or at random intervals, causes the scanning program to randomly change to a different form each time, the cracker does not have time to analyze and rewrite the scanning program into a fake scanning program.

FIG. 4 depicts an example of execution of the program under test TP. In the scan area 130 of the RAM 103, a content key decrypting program 401, a content decrypting program 402 and a content processing program 403 are implemented as the program under test TP. Through a network such as the Internet, by a broadcast wave, or from the HDD 107, encrypted content (encrypted content E(412)) and an encrypted content key (encrypted content key E(411)) are acquired by the information processing apparatus 100 and the encrypted content key E(411) is decrypted by the content key decrypting program 401.

The content decrypting program 402 uses the decrypted content key 411 and decrypts the encrypted content E(412). The decrypted content 412 is subjected to given processing by the content processing program 403 (e.g., MPEG decoding) and the processed content is displayed on the display 105.

FIGS. 5 to 8 depict examples of the scanning program SP. In FIGS. 5 to 8, for easy understanding, a simple scanning program SP is depicted. Further, in FIGS. 5 to 8, "laddr_XX" indicates an address, i.e., a logical address corresponding to the scan area 130.

FIG. 5 depicts the scanning program SP that executes scanning of the program under test TP. For example, at laddr_11, if "1" is stored and at laddr_12: "2", at laddr_13: "3", at laddr_14: "4", at laddr_15: "5", are respectively stored, at the steps at addresses 1 to 5, the values are respectively written to laddr_1001 to laddr_1005. At the step at address 6, all values are summed and the sum "15" is written to laddr_1010 at the step at address 7.

At the step at address 8, to the content "15" of laddr_1010 "+80" is added and the sum is multiplied by "*5", whereby (15+80)×5=475 is obtained. At the step at address 9, the calculation result "475" of address 8 is written to laddr_1011 and at the step at address 10, the contents at laddr_1011 "475" is reported to the secure module 110.

The secure module 110 also retains the scan results of the previous scan. If the reported scan results coincide with the retained scan results, tampering has not occurred. On the other hand, if the scan results do not coincide, tampering has occurred and execution of the program under test TP is ended.

FIG. 6 depicts an example of changing the scan addresses from which values are read at the steps at addresses 1 to 5 in the scanning program SP, from laddr_11 to laddr_15, to laddr_21 to laddr_25. In the example depicted in FIG. 6, since values are read from laddr_21 to 25, the scan results reported to the secure module 110 differ from those reported in the example depicted in FIG. 5.

FIG. 7 depicts an example of changing the sequence of scan addresses in the scanning program SP depicted in FIG. 5, and of changing the computation which is dependent on the sequence change. For example, the scanning program SP changes the sequence of the addresses to be scanned at the steps at addresses 1 to 5. Since the scan results differ from those depicted in FIG. 5 only in terms of a change in sequence, the computation at the step at address 6, is also randomly rewritten, whereby the scan results reported to the secure module 110 differ from the values of the scan results of example depicted in FIG. 5.

FIG. 8 depicts an example where, in the scanning program SP depicted in FIG. 7, the scanning program SP does not execute scanning if the scanning program SP is not retained in a designated storage area. In this case, at the secure module 110, the address at which the scanning program SP is retained has been designated.

For example, to the values of the scan addresses read at the steps at addresses 1 to 5, the address retaining the scanning program SP (e.g., the head block) is added. In this case, if the scan result R1 of the scanning program SP depicted in FIG. 8 and retained by the secure module 110, and the scan result R2 of the scanning program SP executed by the processor 101 of the information processing apparatus 100 coincide, the program under test TP has not been tampered with and the scanning program SP can be confirmed to be located at a designated location.

On the contrary, if the results do not coincide, the scanning program SP may have been intentionally retained at another location, whereby in such a case, the program under test TP is ended by a discrepancy in the scan results.

In this manner, if the memory logical-address at which the scanning program SP resides differs, the scan results change and the scanning program SP is written to a memory logical-address different from that assumed, whereby cracking by operation analysis difficult.

Figure 9:
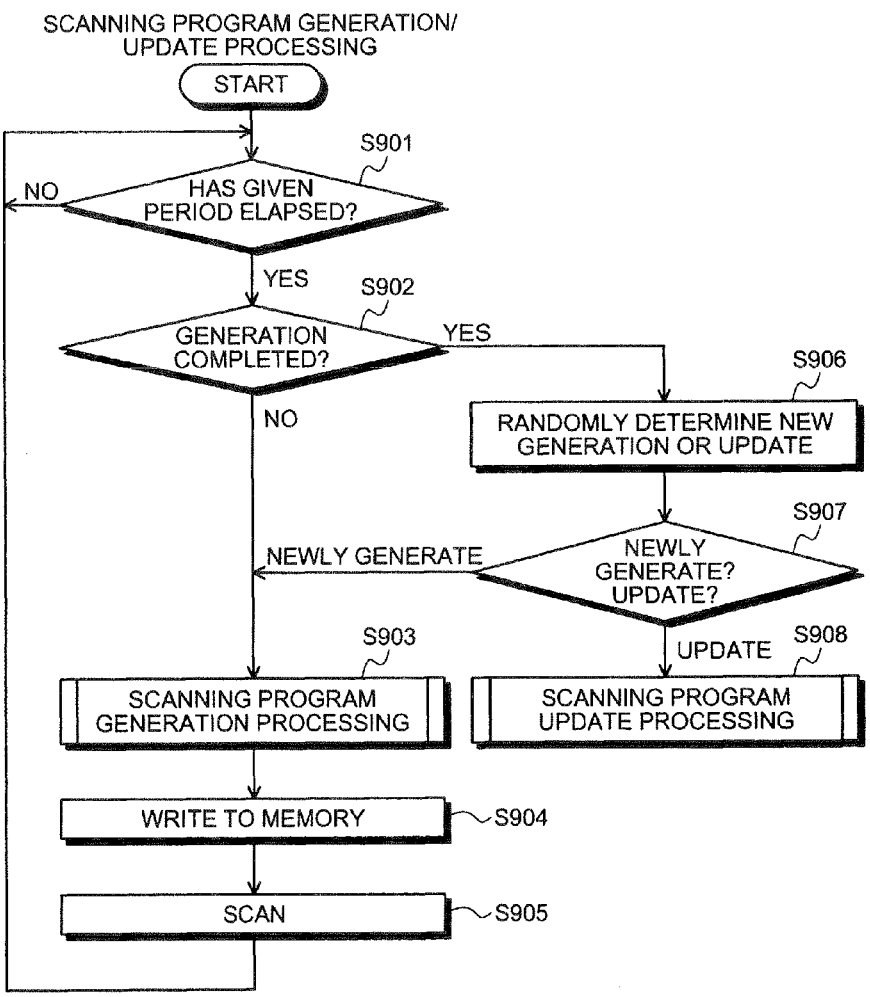
FIG. 9 is a flowchart of scanning program generation/updating processing.

FIG. 9 is a flowchart of scanning program generation/updating processing. The scanning program generation/updating processing is processing performed when the processor 101 of the secure module 110 executes the generating program GP.

The secure module 110 waits for a given period to elapse (step S901: NO). For example, the timing of the given period begins triggered by the start of execution of a program under test TP already written to the scan area 130 of the RAM 103. The given period, as described above, is an interval of several msec to several minutes, and may be randomly set within a range of several msec to several minutes.

When the given period has elapsed (step S901: YES), the secure module 110 judges whether the generation of the scanning program SP has been completed already (step S902). If the generation has not been completed (step S902: NO), the secure module 110 executes the scanning program generation processing (FIGS. 10 to 11) (step S903) and writes the generated scanning program SP to an area that is not to be scanned on the RAM 103 (step S904).

Subsequently, the secure module 110 scans the program under test TP by the generated scanning program SP, retains the scan results in the secure module 110 (e.g., the RAM 204, the flash memory 206) (step S905), and returns to step S901.

At step S902, if the generation of the scanning program SP has been completed (step S902: YES), the secure module 110 determines whether to newly generate a scanning program SP or update the generated scanning program SP (step S906). If a scanning program SP is to be newly generated (step S907: newly generate), the secure module 110 proceeds to step S903. If the scanning program SP is to be updated (step S907: update), the secure module 110 executes the scanning program update processing (FIGS. 12 to 13) (step S908), and writes the updated scanning program SP to an area that is not to be scanned on the RAM 103 (step S904).

Subsequently, the secure module 110 scans the program under test TP by the updated scanning program SP, retains the scan results in the secure module 110 (e.g., the RAM 204, the flash memory 206) (step S905), and returns to step S901.

Upon the deletion of the program under test TP from the scan area 130 by the ending of the program under test TP, which was the impetus for start up, the secure module 110 ends the scanning program generation/updating processing.

Figure 10:
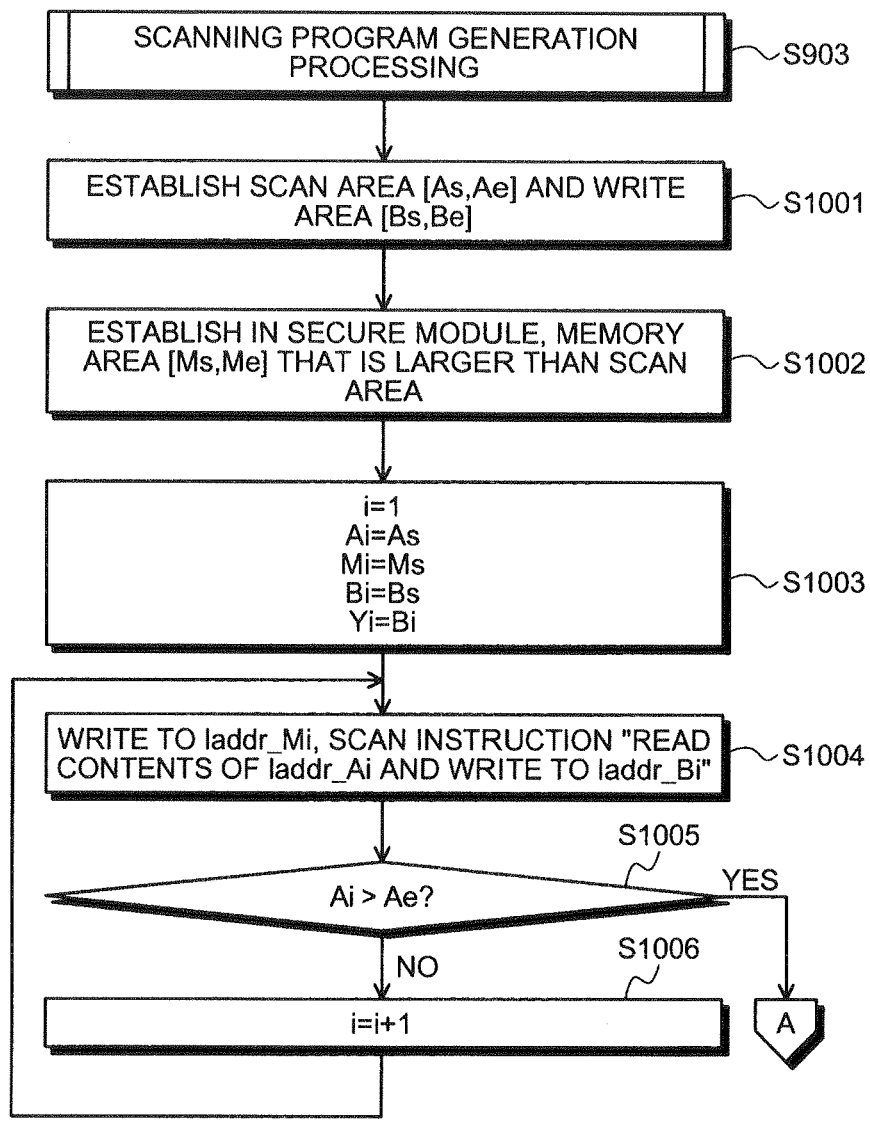
FIGS. 10 and 11 are flowcharts of an example of scanning program generation processing (step S903) depicted in FIG. 9.

FIG. 10 is a flowchart of an example of the first half of the scanning program generation processing (step S903) depicted in FIG. 9. The secure module 110 establishes a scan area 130 [As,Ae] in the RAM 103 external to the secure module 110 and a write area [Bs,Be] (step S1001). The scan area 130 [As,Ae] established may be of a size equivalent to that of the program under test TP or may be of a size equivalent to a portion of the program under test TP.

Further, if the scan area 130 [As,Ae] is of a size equivalent to a portion of the program under test TP, each time the scanning program generation processing is executed, the scan area 130 [As,Ae] is of a different range. For example, each time the scanning program generation processing is executed, the scan area 130 [As,Ae] is shifted.

The secure module 110 establishes in the RAM 204 (or the flash memory 206) of the secure module 110, a memory area [Ms,Me] (established module-area) that is larger than the scan area 130 (step S1002). The secure module 110 initializes various variables (step S1003). i is a variable initialized to 1. Ai indicates an arbitrary address of the scan area 130 and is initialized to the head address As. Bi indicates an arbitrary address of the write area and is initialized to the head address Bs.

Mi indicates an arbitrary address in the established module-area and is initialized to the head address Ms. Yi is an address used in the scanning program SP to be generated and is initialized to Bi. Subsequently, the secure module 110 writes to the laddr_Mi in the established module-area, a command instructing "read contents at laddr_Ai and write to laddr_Bi" (step S1004).

The secure module 110 judges whether Ai>Ae is true (step S1005). Ae is the tail address of the scan area 130. If Ai>Ae not true (step S1005: NO), the secure module 110 increments i (step S1006), and returns to step S1004. On the other hand, if Ai>Ae is true (step S1005: YES), the secure module 110 proceeds to step S1101 depicted in FIG. 11.

Figure 11:
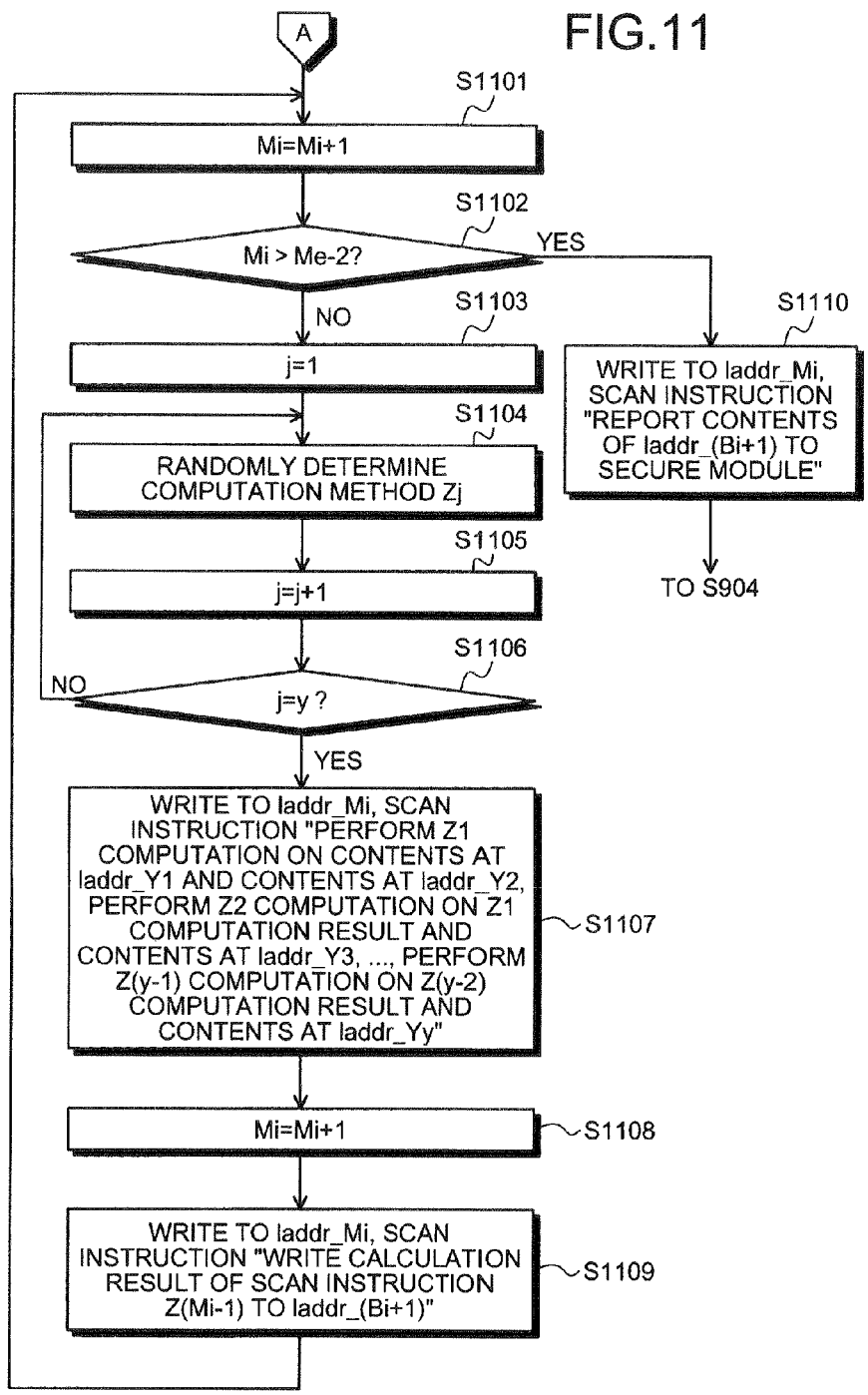

FIG. 11 is a flowchart of an example of the latter half of the scanning program generation processing (step S903) depicted in FIG. 9. After step S1005: YES in FIG. 10, the secure module 110 increments laddr_Mi in the established module-area (step S1101), and judges whether Mi>Me−2 is true (step S1102).

If Mi>Me−2 is not true (step S1102: NO), the secure module 110 sets the initial value of variable j as j=1 (step S1103), and randomly determines computation method Zj (step S1104). The computation method may be, for example, an arithmetic operation, a logical operation, a check sum calculation, a hash value calculation by a hash function, etc. Hereinafter, computation by the computation method Zj is referred to as "Zj computation".

The secure module 110 increments j (step S1105), and judges whether j=y is true (step S1106). Here, y is a count Yi, i.e., the quantity of laddr_Mi in the established module-area.

If j=y is not true (step S1106: NO), the secure module 110 returns to step S1104. On the other hand, if j=y is true (step S1106: YES), the secure module 110 writes to laddr_Mi, a scan command Z (Mi) instructing "perform Z1 computation with respect to contents at laddr_Y1 and contents at laddr_Y2, perform Z2 computation with respect to Z1 computation result and contents at laddr_Y3, . . . , perform Z(y-1) computation with respect to Z(y-2) computation result and contents at laddr_Yy" (step S1107).

The secure module 110 increments Mi (step S1108), writes to laddr_Mi, a scan command instructing "write computation result of scan command Z(Mi—1) to laddr_(Bi+1)" (step S1109), and returns to step S1101.

At step S1102, if Mi>Me—2 is true (step S1102: YES), the secure module 110 writes to laddr_Mi, a scan command instructing "report contents at laddr_(Bi+1) to the secure module 110" (step S1110), and proceeds to step S904. According to the scanning program processing (step S903), the scanning program SP can be randomly generated periodically (or at random intervals).

Figure 12:
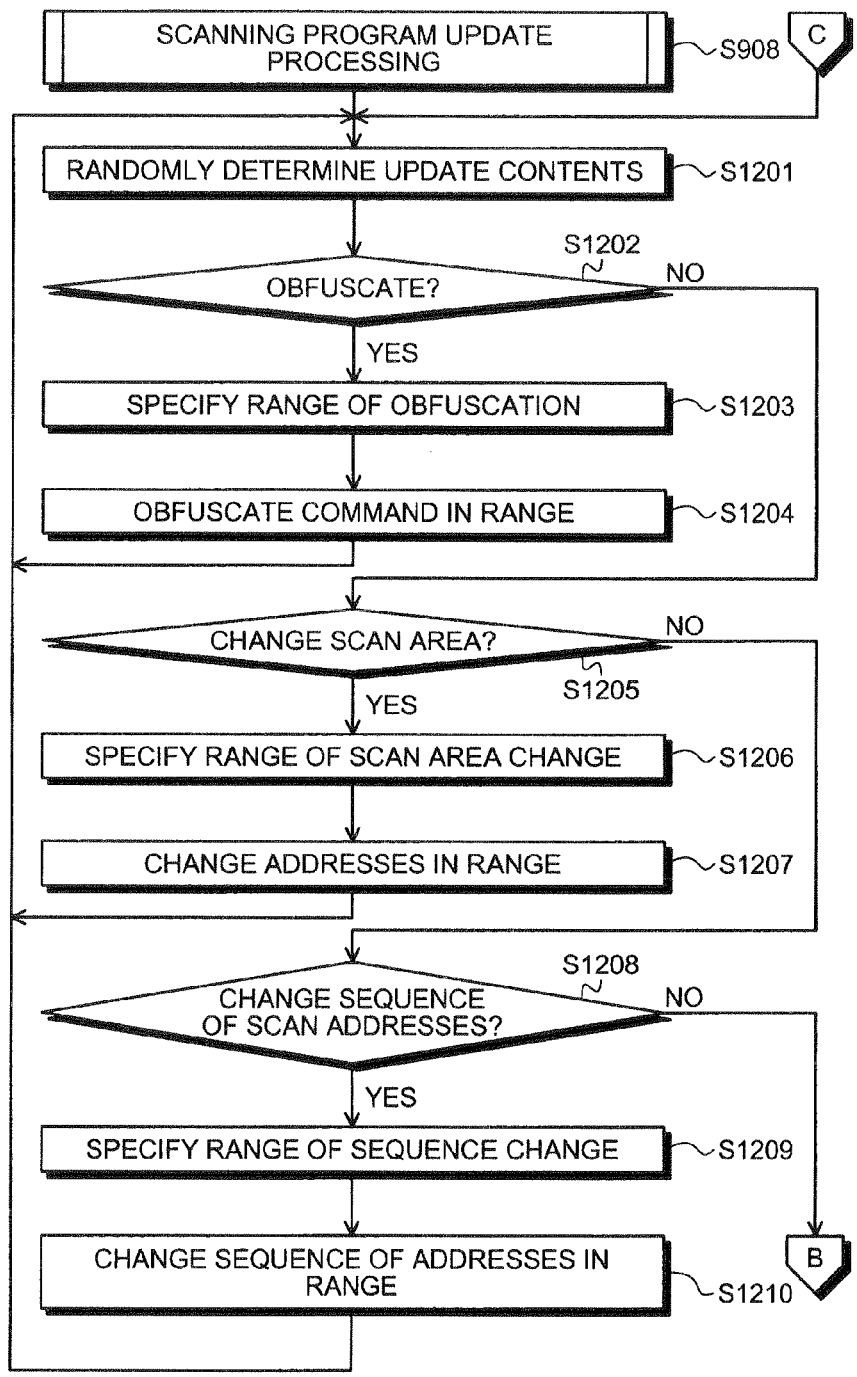
FIGS. 12 and 13 are flowcharts of an example of scanning program update processing (step S908).

FIG. 12 is a flowchart of an example of the scanning program update processing (step S908). The secure module 110 randomly determines the contents of update (step S1201). Here, the contents of the update is, for example, "obfuscation", "changing the scan area", "changing the order of scan addresses", "additional scan result computation", "scanning program SP address addition", "do nothing", etc.

Sequence changing of "obfuscation", "changing of scan area", and "changing of order of scan addresses" is described with reference to FIG. 12. On the other hand, "additional scan result computation", "scanning program SP address addition", and "do nothing" are described with reference to FIG. 13. In the scanning program update processing, it is sufficient to perform at least 1 of the 6 updates (excluding, "do nothing").

As depicted in FIG. 12, the secure module 110 determines whether the content of the update randomly determined is "obfuscation" (step S1202). Obfuscation is a method of making the deciphering of a command or a group of commands difficult by complicating the command(s), such as replacing a command with a command where "the operation is the same, but details of processing are a different program code". For example, for a single command, a command of "X=1+Y" is updated with "X=10−9+2Y−Y". Further, commands of "X=1+Y" and "Z=X+50" are updated with commands of "X=26+Y" and "Z=X+25".

Although the updated command performs the same operation as before the updating, the program code is different, whereby the generating program GP, before and after the update has "the same operation, but details of processing are a different program code". Even if a cracker has viewed the generating program GP code, the program code of the generating program GP is different at each update, making analysis difficult and a further advantage is that the cracker cannot know which portion of the generating program GP includes essential code.

If the updating is by "obfuscation" (step S1202: YES), the secure module 110 specifies the range to be obfuscated in the program under test TP (step S1203), obfuscates a command(s) (limited to commands that can be obfuscated) in the specified ranged (step S1204), and returns to step S1201.

On the other hand, at step S1202, if the updating is not by "obfuscation" (step S1202: NO), the secure module 110 judges whether the updating is by "changing the scan area" (step S1205).

"Changing the scan area" is the changing of a scan address specified in the scanning program SP to a different address in the scan area 130. For example, in updating the scanning program SP depicted in FIG. 5 to the scanning program SP depicted in FIG. 6, a changing of the scan area is executed.

If updating is by "changing the scan area" (step S1205: YES), the secure module 110 specifies the range of the scan area 130 change, from the program under test TP (step S1206), changes the address(es) to the address(es) of the specified range (step S1207), and returns to step S1201.

Even if the scan area is changed, only the address that the generating program GP accesses is changed and the operation of the scanning program SP remains the same. Further, by changing the scan area 130, the scan results are also updated, whereby security is strengthened.

At step S1205, if the updating is not by "changing the scan area" (step S1205: NO), the secure module 110 judges whether the updating is by "changing the order of scan addresses" (step S1208). Changing the order of the scan addresses is a replacement of code at a given address in the scanning program SP with the code at another given address.

For example, in changing the scanning program SP depicted in FIG. 5 to the scanning program SP depicted in FIG. 7, the order of the scan addresses is changed. Although the sequence of execution is changed by changing the sequence of scan addresses, the scan results may or may not change before and after the change.

If the updating is by "changing the sequence of the scan addresses" (step S1208: YES), the secure module 110 specifies the range of sequence change, from the program under test TP (step S1209), changes the code to the code at the address(es) of the specified range (step S1210), and returns to step S1201. On the other hand, at step S1208, if the updating is not by "changing the sequence of the scan addresses" (step S1208: NO), the secure module 110 proceeds to step S1301 depicted in FIG. 13.

Figure 13:
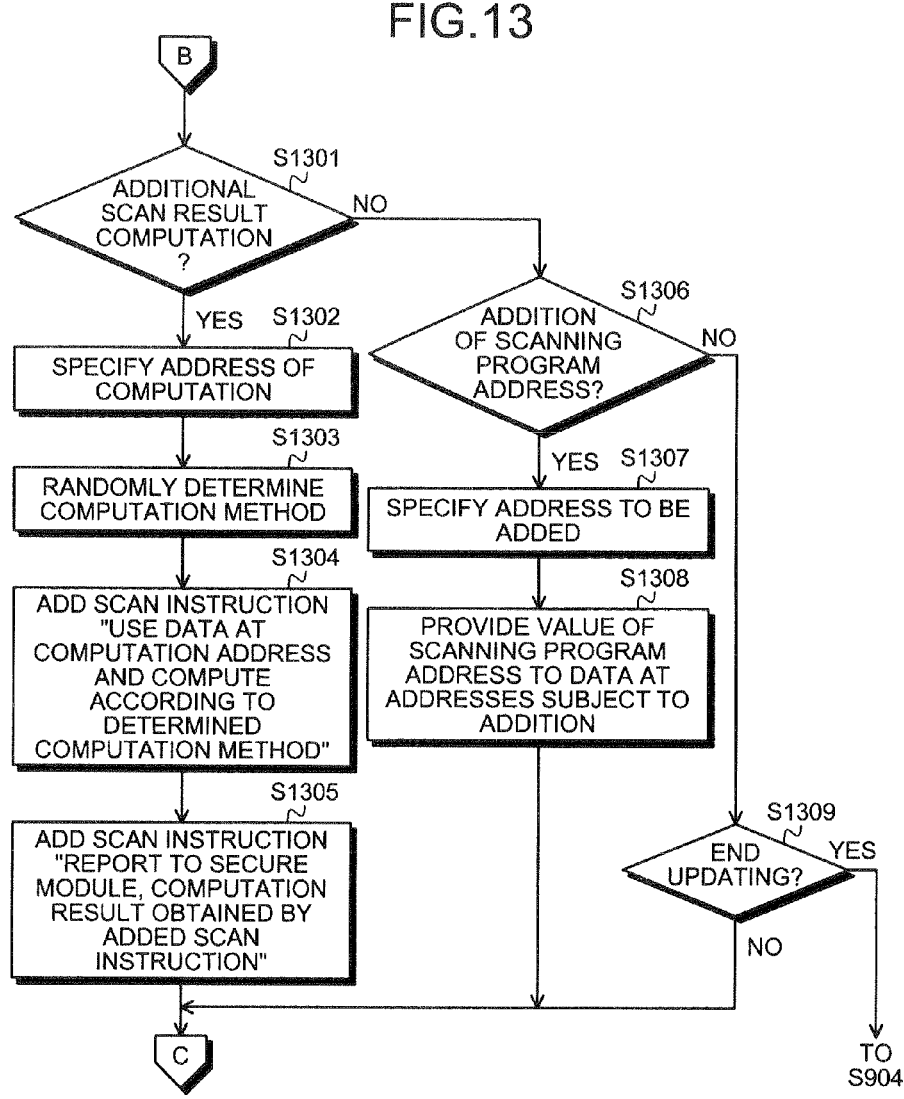

FIG. 13 is another flowchart of the example of the scanning program update processing (step S908). At step S1301, the secure module 110 judges whether the updating is by "additional scan result computation" (step S1301).

If the updating is by "additional scan result computation" (step S1301: YES), the secure module 110 specifies an address to be subject to computation, from the program under test TP (step S1302) and randomly determines the computation method (step S1303). Here, the computation method is arithmetic operation and/or logical operation with respect to data at addresses subject to computation, a check sum calculation for each data item, and/or a hash value calculation by a hash function.

The secure module 110 adds to the scanning program SP that is subject to updating, a scan command instructing "use data at computation address and perform computation method determined at step S1303" (step S1304). Further, the secure module 110 adds to the scanning program SP that is subject to updating, a scan command instructing "report to the secure module 110, computation results obtained by additional scan command" (step S1305), and returns to step S1201.

At step S1201, if the updating is not by "additional scan result computation" (step S1301: NO), the secure module 110 judges whether the updating is by "scanning program SP address addition" (step S1306). Scanning program SP address addition is a method of providing the address of the scanning program SP to a command at a given address in the scanning program SP to obtain a scan result dependent on the address of the scanning program SP.

For example, in updating the scanning program SP depicted in FIG. 7 to the scanning program SP depicted in FIG. 8, the scanning program SP address addition is executed.

At step S1306, if the updating is by "scanning program. SP address addition" (step S1306: YES), the secure module 110 specifies from the program under test TP, the address(es) to be subject to the addition (step S1307), and as depicted by the addresses 1 to 5 in FIG. 7, additionally provides the value of the scanning program SP address to the data at the addresses subject to the addition, rewriting the data (step S1308), and subsequently returns to step S1201.

At step S1306, if the updating is not by "scanning program SP address addition" (step S1306: NO), the secure module 110 judges whether to end the updating of the generating program GP (step S1309). For example, since there are cases where "do nothing" is randomly determined, if updating has not been performed even once, the secure module 110 does not end the updating (step S1309: NO), and returns to step S1201.

If updating has been performed at least once or a predetermined number of updates has been performed, the secure module 110 randomly ends the updating (step S1309: YES) and returns to step S904 depicted in FIG. 9.

In this manner, since execution is within the secure module 110 having a tamper-proof configuration, the generation/updating of the scanning program SP can be performed securely each time, whereby disabling of the scan function by cracking becomes difficult and security can be strengthened even with a USB connection.

Modification of the program under test TP will be described. As described with respect to FIG. 3, the processor 201 in the secure module 110, by executing the modifying program PP, modifies the program under test TP. Here, modification of the program under test TP will be described in detail.

Figure 14:
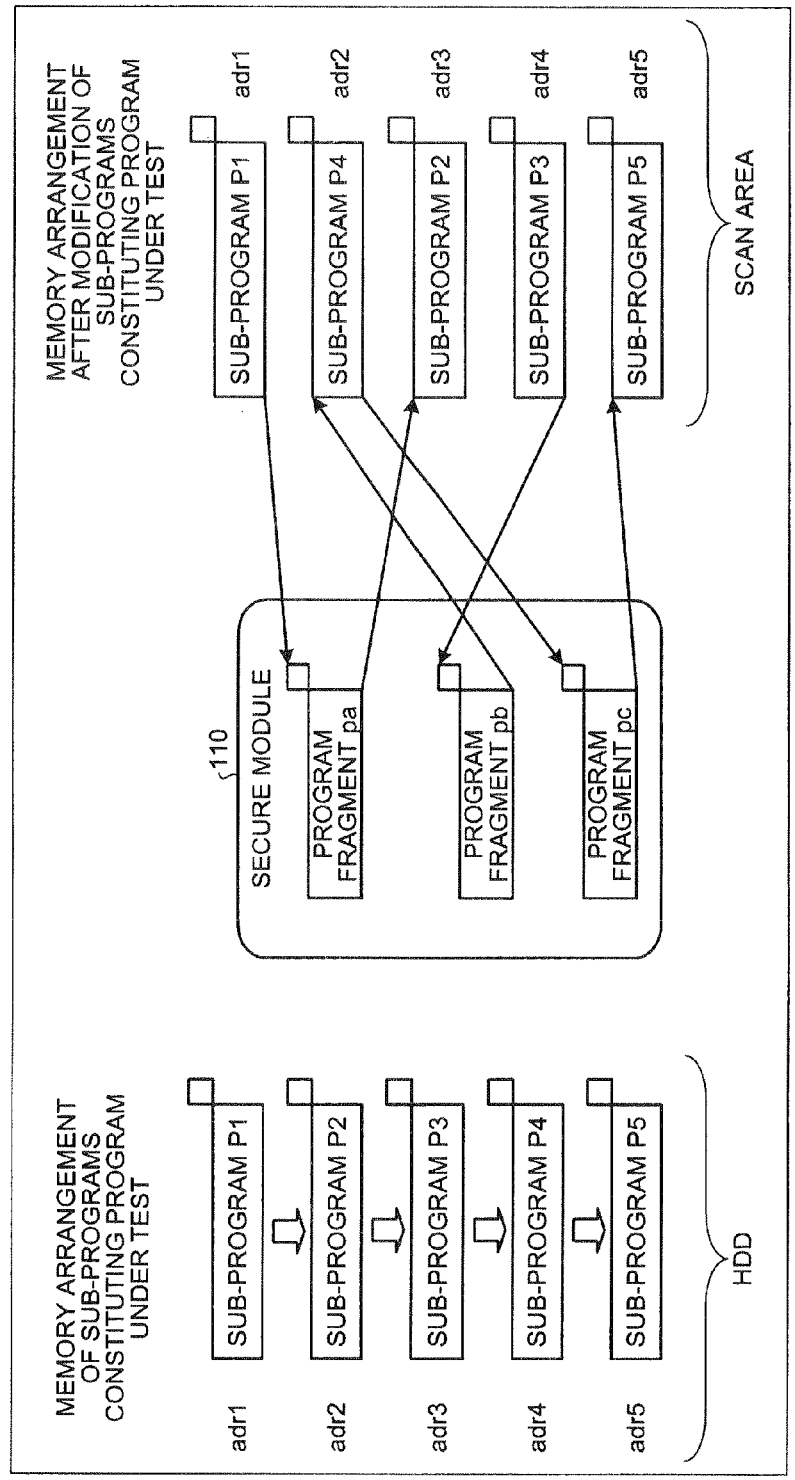
FIG. 14 depicts an overview of modification of the program under test TP.

FIG. 14 depicts an overview of the modification of the program under test TP. A program is a collection of commands at respective addresses. For convenience, the program under test TP is made up of the commands at each of the 5 addresses, e.g., is made up of sub-programs P1 to P5, executed in the order of sub-programs P1 to P5 according to the addresses adr1 to adr5 and are therefore stored as logical addresses in the HDD 107, sequentially in the execution order of addresses adr1 to adr5.

The arrangement order, i.e., the addresses of program under test TP (sub-programs P1 to P5), is rearranged by the modifying program PP. In FIG. 14, address adr1 modified as sub-program P1, address adr2 modified as sub-program P4, address adr3 modified as sub-program P2, address adr4 modified as sub-program P3, and address adr5 modified as sub-program P5.

In this case, after the sub-programs P1, P4, and P3 a READ command instructing reading from the secure module 110 is additionally described. Program fragments indicating correlations after address rearrangement are retained in the secure module 110. For example, program fragment pa is a Goto statement jumping to address adr3, referenced after the execution of the sub-program P1.

Program fragment pb is a Goto statement jumping to address adr2, referenced after the execution of the sub-program P3. Program fragment pc is a Goto statement jumping to address adr5, referenced after the execution of the sub-program P4. The program fragments pa to pc are generated at modification. The scan result R1 remains the same before and after modification.

FIGS. 15 to 17B depict an example of modification of the program under test TP by the modifying program PP. In the example depicted in FIG. 15, the commands at addresses 3 to 5 of the program under test TP in the HDD 107 are moved to addresses 7 to 9. Further, the commands at addresses 6 and 7 of the program under test TP are moved to addresses 15 and 16; and the commands at addresses 1 and 2 remain as they are.

Before modification, the command "Z=X+Y" at address 3 is executed after the command "Y=X+8" at address 2. Since the "Z=X+Y" at address 3 has been moved to address 7, the contents at address 3 are rewritten to a program fragment (jump command) "Goto7". The secure module 110 correlates address 3 and the program fragment "Goto7" in a table and stores the table.

Similarly, before modification, the command "Z=5+Z" at address 6 is executed after the command "Z=Z+1" at address 5. Since the command "Z=Z+1" at address 5 has been moved to address 9 and the command at address 6 has been moved to address 15, the contents at address 10 (the address subsequent to address 9) is rewritten to a program fragment (jump command) "Goto15". The secure module 110 correlates address 10 and the program fragment "Goto15" in the table and stores the table.

Before writing the program under test TP to the scan area 130, the secure module 110 rewrites the program fragment to a READ command instructing reading from the secure module 110. As a result, when the modified program under test TP implemented at the scan area 130 is executed, according to the READ command at address 3, the table in the secure module 110 is referenced and the program fragment "Goto7" corresponding to address 3 is identified. The secure module 110 informs the processor 101 of "Goto7", whereby the processor 101 executes the command at address 7 of the modified program under test TP.

In this manner, the commands making up the program under test TP are shuffled while storing the respective correspondences, whereby the program under test TP becomes difficult to decipher, enabling security to be improved.

Figure 15:
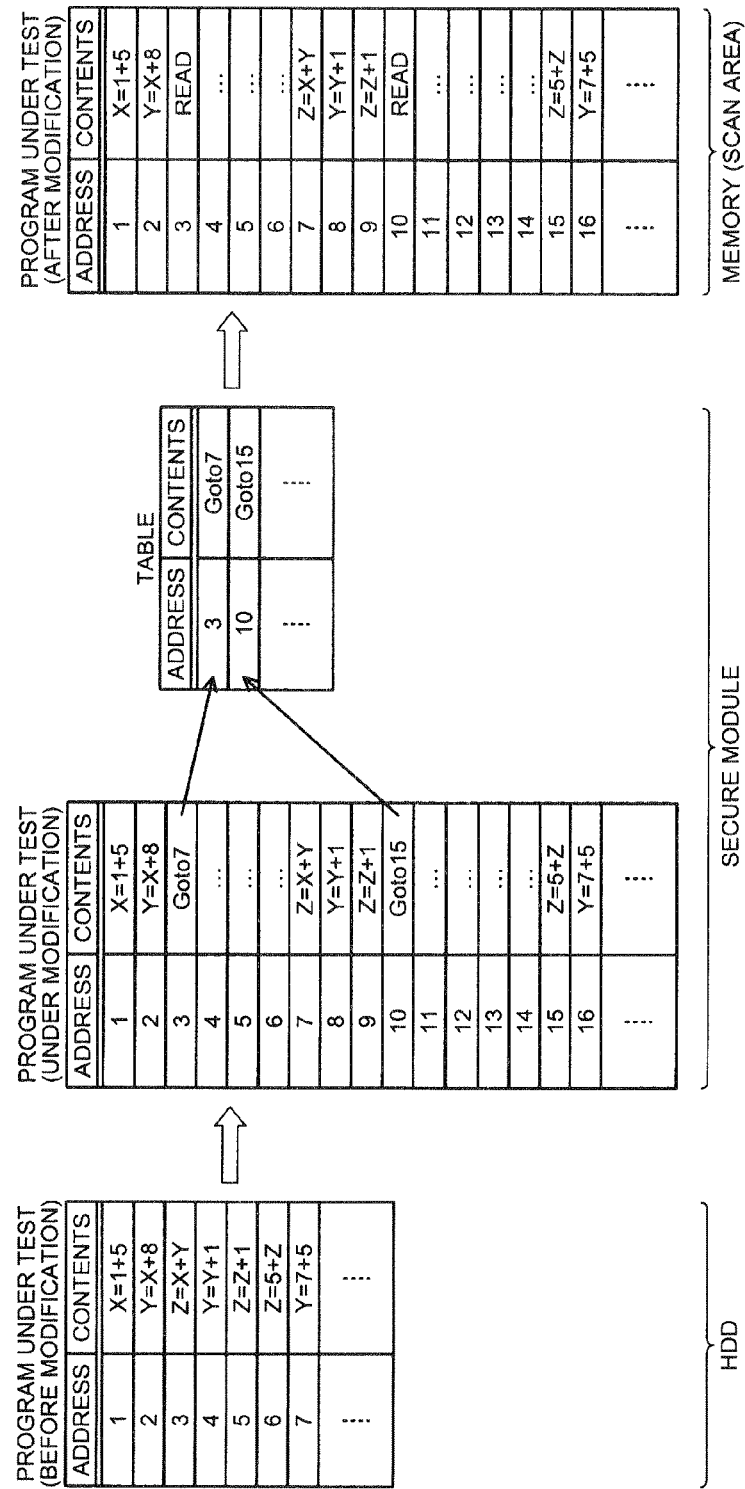
Figure 16:
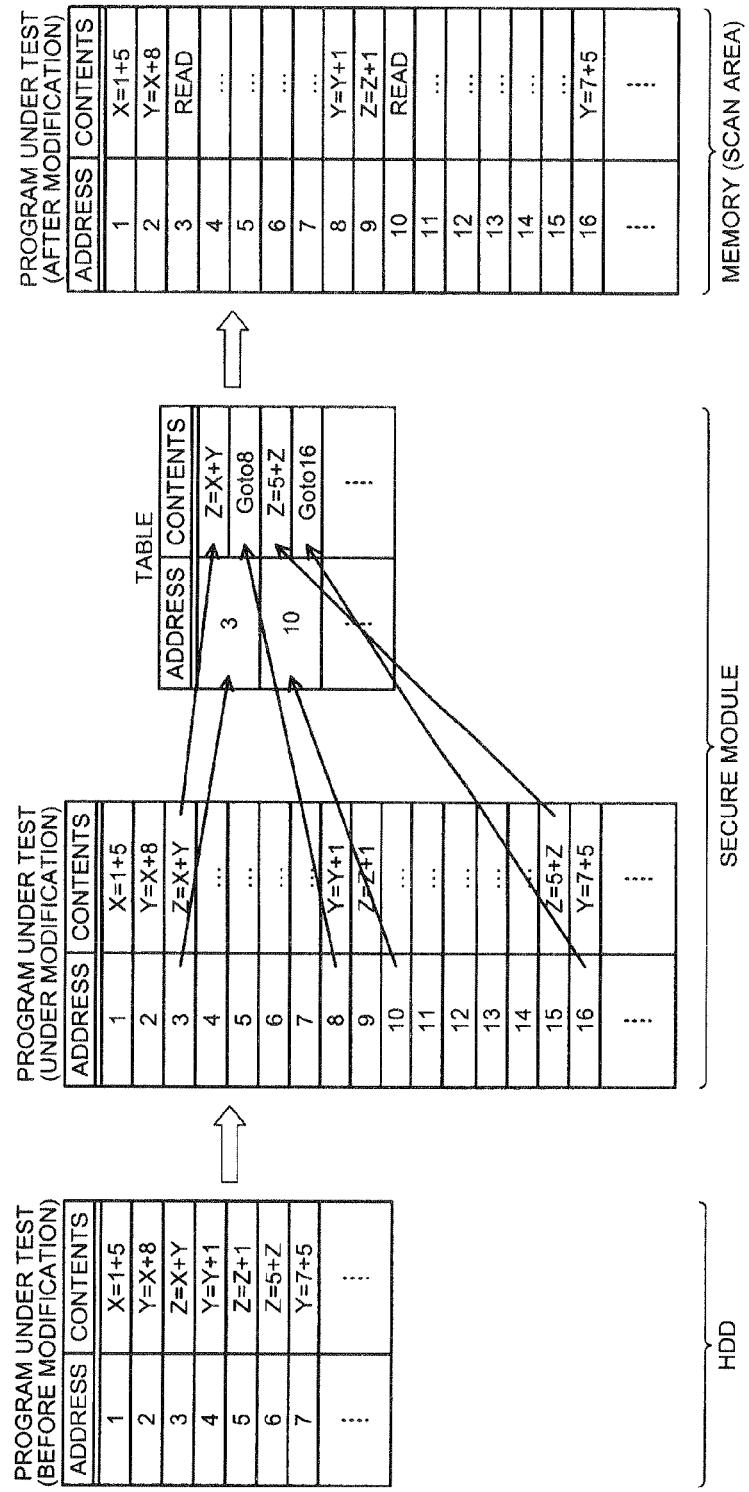

FIG. 16 is an example of modification that is more complicated than that depicted in FIG. 15. For example, in FIG. 15, a program fragment was a mere jump command, whereas in FIG. 16, a command constituting the program under test TP is further inserted.

In the example depicted in FIG. 16, the commands at addresses 4 and 5 of the program under test TP in HDD 107 are moved to addresses 8 and 9. Further, the commands at addresses 6 and 7 of the program under test TP are moved to addresses 15 and 16; and the commands at addresses 1 to 3 remain as they are.

Before modification, the command "Z=X+Y" at address 3 is executed after the command "Y=X+8" at address 2. Since the command at address 4 (the address subsequent to address 3) has been moved to address 8, a Goto statement "Goto8" is generated. The secure module 110 correlates and stores to the table, address 3, the command "Z=X+Y" at address 3, and the generated Goto statement "Goto8". In this manner, rather than a mere jump command, by complicating the program fragment, improved security can be facilitated.

Figure 17A:
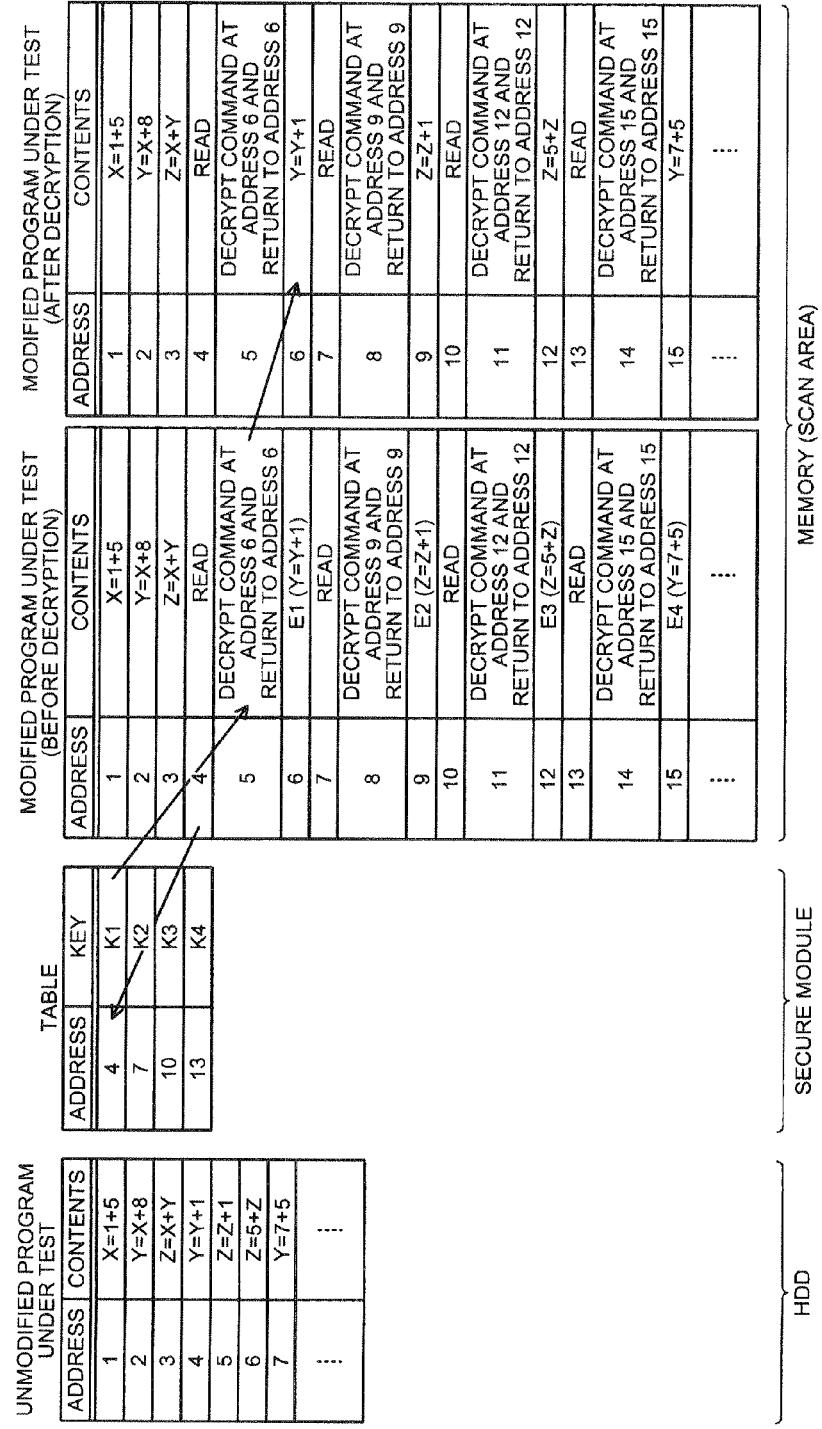

FIG. 17A depicts an example of encrypting the commands constituting the program under test TP. In the example depicted in FIG. 17A, the secure module 110 encrypts the commands at address 4 to 7 of the program under test TP (before modification) using encryption/decryption keys K1 to K4. Next, the secure module 110 inserts a READ command instructing reading from the secure module 110 and a decrypt command before the encrypted commands, whereby the addresses are shifted downward by the number of inserted commands.

For example, the command "Y=Y+1" at address 4 is encrypted using the encryption/decryption key K1 and written to address 6. At address 4, which has become empty, a READ command instructing reading from the secure module 110 is inserted and a decrypt command is inserted at address 5.

Subsequently, the secure module 110 correlates and stores to the table, the key used to encrypt the command in the program under test TP (after modification) and the address of the READ command inserted for the encrypted command. For example, the secure module 110 correlates and stores to a table, the encryption/decryption key K1 used to encrypt the encrypted command E1(Y=Y+1) written at address 6 and address 4 at which the READ command has been inserted consequent to the generation of the encrypted command E1(Y=Y+1).

Thereafter, the secure module 110 stores the table to the RAM 204 or the flash memory 206 and writes the modified program under test TP to the scan area. When the program under test TP (after modification) is executed, the encryption/decryption key is read consequent to the inserted READ command and consequent to the decrypting command (the next command), the encrypted command is decrypted, enabling the decrypted command to be executed. For example, if address 4 has a READ command, the secure module 110 refers to the table and passes the encryption/decryption key K1 to the processor 101. The processor 101, using the encryption/decryption key K1 and following the decrypting command at address 5, decrypts the encrypted command E1(Y=Y+1) and writes the command "Y=Y+1" to address 6, whereby at address 6, the command "Y=Y+1" is executed. Thus, even if a portion of the program to be scanned is encrypted, by acquiring a decryption key from the secure module 110, the processing can be continued.

FIG. 17B is an example of encryption of a group of commands constituting the program under test TP. In the example depicted in FIG. 17B, the secure module 110 substitutes the commands at addresses 4 to 7 of the program under test TP (before modification) with a READ command instructing reading from the secure module 110, e.g., substitutes the command "Y=Y+1" at address 4 with a READ command. The secure module 110 inserts at address 5 (the next address), a command instructing "write the command "Y=Y+1" read from the secure module 110 in compliance with the command at address 4".

Subsequently, the secure module 110 correlates and stores to the table, the substituted command and the corresponding address. For example, the secure module 110 correlates address 4 subject to the substitution and the command thereof "Y=Y+1" in a table.

Thereafter, the secure module 110 stores the table to the RAM 204 or the flash memory 206 and writes the modified program under test TP to the scan area. When the program under test TP (after modification) is executed, the processor 101, in compliance with the substituted READ command, reads out the original command before the substitution. For example, the processor 101, in compliance with the READ command at address 4, reads out from the secure module 110 and executes the command "Y=Y+1".

Figure 18:
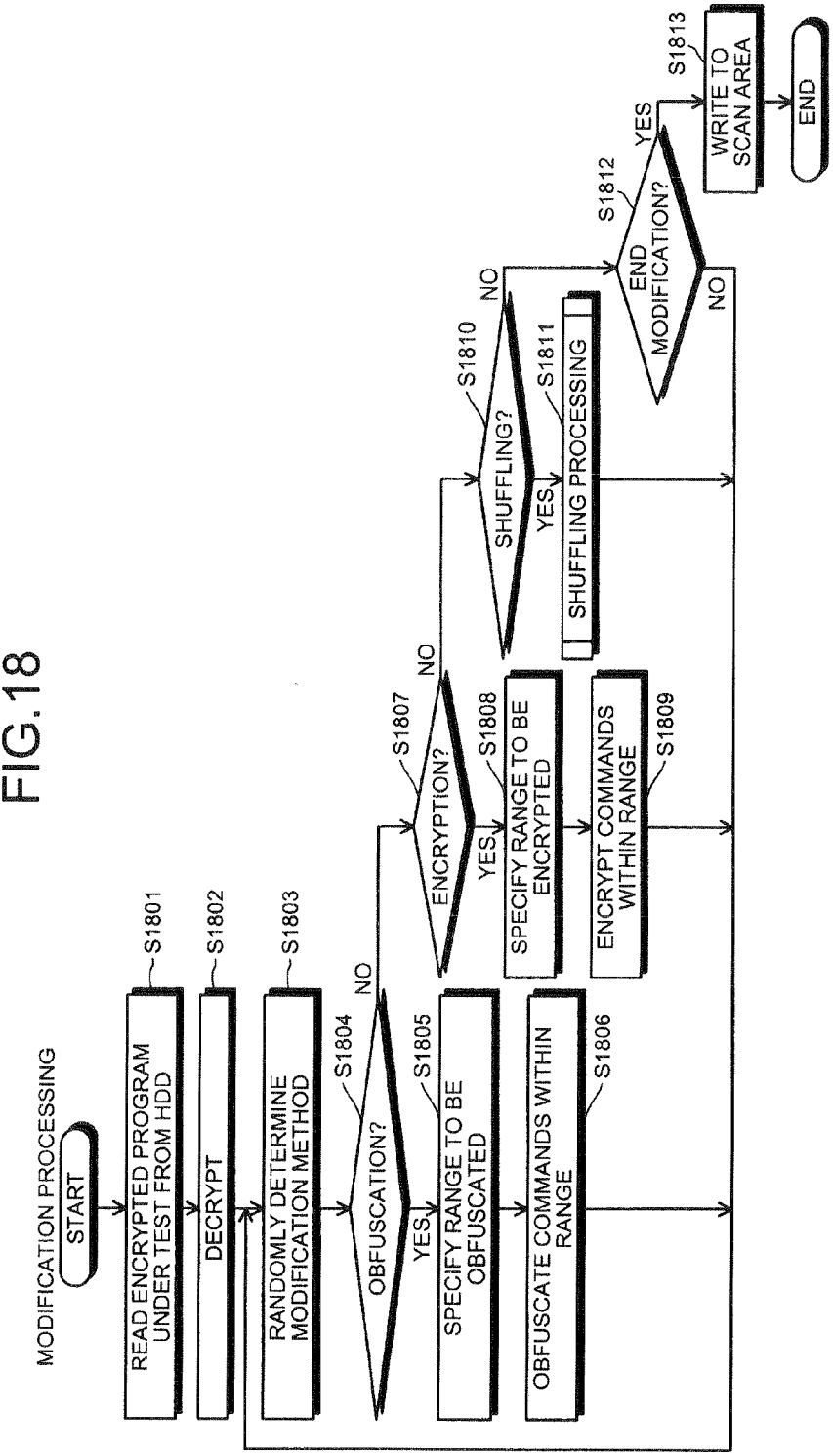
FIG. 18 is a flowchart of program under test TP modification processing.

FIG. 18 is a flowchart of program under test TP modification processing. As depicted, the secure module 110 reads the encrypted program under test E(TP) from the HDD 107 (step S1801) and decrypts the encrypted program under test E(TP) (step S1802). If the program under test TP is not encrypted in the HDD 107, the program under test TP is simple read from the HDD 107.

The secure module 110 randomly determines the modification method for the program under test TP (step S1803). For example, the secure module 110 determines the modification method from among "obfuscation", "encryption" (see FIG. 17), "shuffling" (see FIGS. 16 and 17), and "do nothing".

If the modification method is "obfuscation" (step S1804: YES), the secure module 110 specifies from program under test TP, a range to be obfuscated (step S1805), obfuscates the command(s) within the specified range (step S1806), and returns to step S1803.

At step S1804, if the modification method is not "obfuscation" (step S1804: NO), the secure module 110 judges whether the modification method is "encryption" (step S1807). If the modification method is "encryption" (step S1807: YES), the secure module 110 specifies from the program under test TP, a range to be subject to encryption (step S1808) and encrypts the command(s) within the range (step S1809), at which time, as depicted in FIG. 17, the address subject to encryption and the decryption key for decrypting the encrypted command at the address are correlated and retained in a table. Subsequently, the secure module 110 returns to step S1803.

At step S1807, if the modification method is not "encryption" (step S1807: NO), the secure module 110 judges whether the modification method is "shuffling" (step S1810). If the modification method is "shuffling" (step S1810: YES), the secure module 110 executes shuffling processing (FIG. 19) and after the shuffling processing (step S1811), returns to step S1803.

At step S1810, if the modification method is not "shuffling" (step S1810: NO), the secure module 110 judges whether modification has ended (step S1812). For example, in this example, assuming the modification method has been randomly determined to be "do nothing", if modification has not been performed even once, the modification is not ended (step S1812: NO), in which case, the secure module 110 returns to step S1803.

If modification has been performed at least once or a predetermined number of times, modification is randomly ended (step S1812: YES). In this case, the modified program under test TP is written to the scan area 130 of the RAM 103 (step S1813), ending the modification processing.

FIG. 19 is a flowchart of the shuffling processing (step S1811) depicted in FIG. 18. Here, as an example, the shuffling depicted in FIG. 15 will be described. The secure module 110 establishes a modification destination area in the secure module 110 (step S1901) and separates the program under test TP into multiple command groups (step S1902).

The secure module 110 sets the head command group as the command group to be shuffled (step S1903). The secure module 110 judges whether there is a command group subsequent to the command group to be shuffled (step S1904). If there is a subsequent command group (step S1904: YES), the secure module 110 randomly generates a program fragment (e.g., Goto statement) (step S1905). For example, the secure module 110 generates the program fragment randomly and so that an area to which the command group to be shuffled will be placed, is established.

Subsequently, the secure module 110 sets the address of the generated program fragment as the address subsequent to the tail address of the command group to be shuffled (step S1906). The secure module 110 correlates and adds to the table, the program fragment and the address at which the program fragment is written (step S1907).

The secure module 110 writes at the address allocated to the program fragment of the program under test TP, a READ command for the program fragment (step S1908). Subsequently, the secure module 110 sets the subsequent command group as the command group to be shuffled at the address specified by the program fragment (if the program fragment is "Goto8", then at address "8") (step S1909), and returns to step S1904.

At step S1904, if there is no subsequent command group (step S1904: NO), the secure module 110 ends the shuffling processing and returns to step S1803.

In this manner, by modifying the program under test TP, security can be strengthened even against cracking of the program under test TP. The modification processing described above is executed each time the encrypted program under test TP is read and at each execution, the program under test TP modification method changes, whereby analysis of the program under test TP can be made more difficult for a cracker.

Further, if the scanning program SP scans the scan area 130 at random intervals or periodically, before the scanning program SP is updated, the modifying program PP randomly writes data and/or code to the scan area 130. Before updating, by using the scanning program SP to scan after modification, proper operation of the scanning program SP can be continually confirmed.

Figure 20A:
FIGS. 20A, 20B, and 20C depict examples of modification of the program under test TP.
Figure 20B:
Figure 20C:

FIGS. 20A to 20C depict examples of modification of the program under test TP. In FIG. 20A, an example is depicted where the commands at addresses 1 to 4 of the program under test TP are obfuscated and NOP is added to addresses 5 to 7. In FIG. 20B, and example is depicted where the commands at addresses 1 to 4 remain as they are and commands are added to addresses 5 to 7, however, the result is the same. In FIG. 20C, an example is depicted where the commands at addresses 1 to 4 remain as they are and since meaningless commands are added to addresses 5 to 7, the results are the same.

Thus, after the program under test TP on the left-hand side of FIG. 20 is scanned, the program under test TP is modified as depicted on the right-hand side of FIG. 20 and before the updating of the scanning program SP, the modified program under test TP is scanned, whereby proper operation of the scanning program SP can be continually confirmed.

As described above, according to the embodiment, even with an interface that does not support hardware scanning, scanning is implemented that is not easily disabled by a cracker. In particular, by increasing the frequency at which the scanning program SP is updated, security can be further strengthened. Furthermore, since program under test TP is modified each time the program under test TP is written to the scan area 130, security can be further strengthened.

In the embodiment, although an example has been explained where the secure module 110 is connected by a USB connection to the information processing apparatus 100 capable of PCI (or PCIe) connection and USB connection, configuration is not limited to USB and may be compatible with standards other than USB standards.

Further, the embodiment can be used when security (protection of digital AV information from theft) is to be guaranteed on software of open-architecture PCs such as when digital AV information, game software, and applications are transmitted by digital broadcast or broadband internet.

The secure module and the information processing apparatus according to the present invention effect scanning that is not easily disabled by crackers and is implemented even with interfaces that do not support hardware scanning.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a processor being configured to elevate instructions;
a memory;
a secure module; and
a storage device, coupled to the processor, configured to store therein a unique code for a program under test,
wherein the processor is coupled to the memory and configured to execute programmed instructions stored in the memory to perform the steps of:
generating a scanning program that causes scan processing, which generates the unique code for the program under test, to be executed by the processor and executes update processing of randomly updating contents of the scanning program;
modifying the program under test into program code having description content that is different and a function that is the same as the program prior to modifying, wherein unique code for the modified program under test is written to the storage device, overwriting existing unique code; and
authenticating, when the scanning program is executed with respect to the program under test stored at a designated storage area in the memory, validity of the program under test stored at the designated storage area, based on the unique code stored in the storage device and execution results of the scanning program, wherein the secure module includes a structure configured to prohibit internally stored information from being referenced externally, and
wherein the modifying further includes:
shuffling a command in the program under test;
storing in the storage device, a table correlating a jump command specifying an address to which a jump is made and an address of the jump command;
changing contents of the jump command in the program under test post-shuffling, to a read-command for the table; and
writing to the designated storage area, the program under test including the read-command.

2. A secure module comprising:
a memory;
a processor coupled to the memory; and
a storage device, coupled to the processor, configured to store therein a unique code for a program under test;
wherein the processor is configured to execute programmed instructions stored in the memory to perform the steps of:
generating a scanning program that causes scan processing, which generates the unique code for the program under test, to be executed at a connected device and further executes update processing of randomly updating contents of the scanning program;
modifying the program under test into program code having description content that is different and a function that is the same as the program prior to modifying, wherein unique code for the modified program under test is written to the storage device, overwriting existing unique code; and
authenticating, when the scanning program is executed by the connected device and executed with respect to the program under test stored at a designated storage area in the connected device, validity of the program under test stored at the designated storage area, based on the unique code stored in the storage device and execution results of the scanning program executed at the connected device,
wherein the processor is configured to:
shuffle a command in the program under test;
store in the storage device, a table correlating a jump command specifying an address to which a jump is made and an address of the jump command;

change contents of the jump command in the program under test post-shuffling, to a read-command for the table; and write to the designated storage area, the program under test including the read-command.

3. The secure module according to claim 2, wherein the processor is configured to execute the update processing periodically.

4. The secure module according to claim 2, wherein the processor is configured to execute the update processing at random intervals.

5. The secure module according to claim 2, wherein the processor is configured to obfuscate a command of the scanning program.

6. The secure module according to claim 2, wherein the processor is configured to change an address that is to be scanned in the designated storage area and that has been specified by the scanning program.

7. The secure module according to claim 2, wherein the processor is configured to change a sequence of addresses that are to be scanned in the designated storage area and that are specified in a command group in the scanning program.

8. The secure module according to claim 2, wherein the processor is configured to change contents of a computation command that is based on data specified by a command in the scanning program; and to store to the storage device, a computation result obtained consequent to the computation command post-change; and to add a command to return the obtained computation result to the secure module.

9. The secure module according to claim 2, wherein the processor is configured to change a command in the scanning program to a command dependent on an address at which the scanning program is stored in the connected device.

10. The secure module according to claim 2, wherein the processor is configured to randomly generate a scanning program having description content that is different while maintaining generation of code identical to the unique code.

11. The secure module according to claim 2, wherein the processor is configured to execute the generating periodically.

12. The secure module according to claim 2, wherein the processor is configured to execute the generating at random intervals.

13. The secure module according to claim 2, wherein the processor is configured to obfuscate a command in the program under test.

14. The secure module according to claim 2, wherein the processor is configured to:

substitute a given command in the program under test, with an encrypted command that is the given command encrypted, a read-command instructing reading from the secure module, and a decrypting command instructing decryption of the encrypted command;

store in the storage device, a table correlating an address of the read-command and a decryption key that decrypts the encrypted command; and write to the designated storage area, the modified program under test.

15. The secure module according to claim 2, wherein the processor is configured to:

substitute a given command in the program under test, with a read-command instructing reading from the secure module;

store in the storage device, a table correlating an address of the read-command and the given command pre-substitution; and write to the designated storage area, the modified program under test.

* * * * *